United States Patent
Ingram, Jr. et al.

(10) Patent No.: US 10,293,519 B2
(45) Date of Patent: May 21, 2019

(54) MANDREL BLADDER END FITTING

(71) Applicant: The Boeing Company, Chicago, IL (US)

(72) Inventors: William H. Ingram, Jr., Seattle, WA (US); Jesse M. Havens, Asheboro, NC (US); Megan E. Bliss, SeaTac, WA (US); Amy E. Bahe, Seattle, WA (US); Craig A. Cramer, Bothell, WA (US)

(73) Assignee: The Boeing Company, Chicago, IL (US)

( * ) Notice: Subject to any disclaimer, the term of this patent is extended or adjusted under 35 U.S.C. 154(b) by 622 days.

(21) Appl. No.: 14/928,404

(22) Filed: Oct. 30, 2015

(65) Prior Publication Data
US 2017/0120481 A1 May 4, 2017

(51) Int. Cl.
B29C 33/10 (2006.01)
B29C 33/50 (2006.01)

(52) U.S. Cl.
CPC .................. B29C 33/505 (2013.01)

(58) Field of Classification Search
CPC ... B29C 33/0038; B29C 33/10; B29C 33/505; B29C 70/44; B29C 70/443; B29C 70/54; B29L 2031/757; Y10T 403/7064; Y10T 403/7066; Y10T 403/7067
See application file for complete search history.

(56) References Cited

U.S. PATENT DOCUMENTS

| 6,357,960 | B1* | 3/2002 | Cornelius | F16B 5/002 403/370 |
| 6,692,681 | B1 | 2/2004 | Lunde | |
| 7,527,222 | B2 | 5/2009 | Biornstad et al. | |
| 8,684,343 | B2 | 4/2014 | Hiken et al. | |
| 2013/0139945 | A1* | 6/2013 | Buerkner | B29C 33/505 156/60 |
| 2013/0175749 | A1* | 7/2013 | Hiken | B29C 70/54 269/20 |
| 2015/0008204 | A1* | 1/2015 | Choy | A47B 47/0008 211/186 |

* cited by examiner

Primary Examiner — Michael P Ferguson
(74) Attorney, Agent, or Firm — Miller, Matthias & Hull LLP

(57) ABSTRACT

A mandrel bladder end fitting includes a compression housing defining a circumferential interior wall; the interior wall constitutes a first clamping surface. An expansion assembly, axially received within the interior wall, includes a plurality of wedges that collectively define a second clamping surface. The expansion assembly also includes a central core and a threaded member received within a threaded aperture of the central core. A radially extending flat washer, seated within the interior wall, prevents axial movement of the expansion wedges in one direction. Thus, upon rotation of the threaded member, the central core will move axially toward the washer, forcing the second clamping surface to move only radially outwardly toward the first clamping surface. As such, because the flat washer restricts axial movement of the expansion wedges, relative motion between first and second clamping surfaces; i.e., between the collective wedges and interior wall, is limited to radial movement, only.

19 Claims, 4 Drawing Sheets

MANDREL BLADDER END FITTING

FIELD

The present disclosure relates generally to apparatus used in fabrication of composite structures, and more specifically to couplings for use with inflatable mandrel bladders used in such fabrication.

BACKGROUND

Today's aircraft construction often includes parts formed of composite materials, which may be generally stronger and have greater resistance to high temperatures than parts formed of conventional aluminum alloys. For example, an aircraft may include an outer composite skin, and may even include structural components such as wing spars and ribs formed of weight-bearing composite structures. One description of manufacturing a circumferential frame section of an aircraft fuselage using a composite material may be found in U.S. Pat. No. 7,527,222 B2, assigned to The Boeing Company.

The formation of such composite parts may involve carbon fibers impregnated with a resin, which when cured forms a resin matrix. The curing of the resin matrix involves the use of molds and other apparatus including inflatable elastomeric bladders. Such bladders require vent components which must be attached under leakproof conditions.

A major issue of composite construction has been related to failures of leakproof seals between reusable inflatable mandrel bladders and their associated vented end fitting components. Occasionally an entire sequence of fabrication and curing steps must be repeated, which results in additional expense and materials. Thus there remains a need for greater durability of end fitting assemblies for such inflatable bladders.

SUMMARY

In accordance with one aspect of the present disclosure, an end fitting is configured for establishing a fluid-tight sealing connection with an open end of a mandrel bladder. The end fitting includes an outer body having an axis, and first and second axially oriented interior volumes separated by a radially extending annular step. The volumes are defined by first and second circumferential interior walls, respectively, with the first volume having a larger interior wall than the second, and the interior first wall defining a first clamping surface.

In accordance with another aspect of the present disclosure, an expansion assembly is configured for containment within the first interior volume of the outer body, and is situated along the axis of the outer body. The expansion assembly includes a central core coaxially aligned with the outer body, with the central core including an interior threaded aperture. The expansion assembly also includes an array of expansion wedges situated circumferentially about the central core, between the central core and the first interior wall of the outer body. The expansion wedges define radially outer surfaces configured to circumferentially face the first interior wall of the outer body, and the radially outer surfaces of the expansion wedges collectively define a second clamping surface.

In accordance with another aspect of the present disclosure, an axially extending threaded member includes a threaded shank that mates with the interior threaded aperture of the central core, and a flat washer is seated against the annular step within the first volume. The expansion wedges are axially juxtaposed against one side of the seated washer, and at least one beveled washer spring is positioned against the second side of the washer within the second volume.

In accordance with another aspect of the present disclosure, the end fitting includes a vent passage and a first bevel gear supported in the vent passage. The central core includes an interior threaded aperture, and the expansion assembly has an axially extending threaded member defined by a stud having an externally threaded portion at one end that cooperates with the interior threaded aperture. The first bevel gear is secured to an opposite end of the stud, and cooperates with an externally applied second bevel gear to rotate the first bevel gear.

In accordance with another aspect of the present disclosure, the first bevel gear rotates about the longitudinal axis, the second bevel gear rotates about an axis orthogonal to the longitudinal axis, and the second bevel gear is applied though the vent passage, which is situated orthogonally to the longitudinal axis.

In accordance with yet another aspect of the present disclosure, the flat washer prevents any axial movement of the expansion wedges during any radially outward movement of the second clamping surface, and thus any movement of the second clamping surface relative to the first clamping surface is orthogonal to the axis of the outer body.

The features, functions, and advantages disclosed herein can be achieved independently in various embodiments or may be combined in yet other embodiments, the details of which may be better appreciated with reference to the following description and drawings.

It should be understood that the drawings are not necessarily to scale, and that the disclosed embodiments are illustrated only schematically. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION

The following detailed description is intended to provide both apparatus and methods for carrying out the disclosure. Actual scope of the disclosure is as defined by the appended claims.

Figure 1:
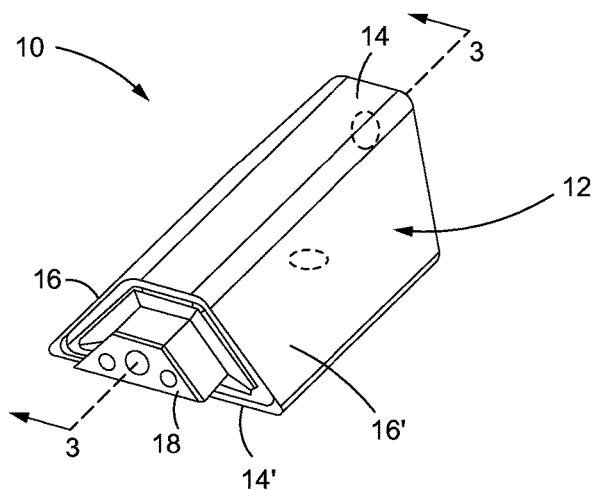
FIG. 1 is a perspective view of an end fitting for a mandrel bladder constructed in accordance with the present disclosure.

In FIG. 1, a mandrel bladder end fitting 10 includes an outer compression housing 12, which constitutes an exterior body portion having a trapezoidal cross-section as shown, although the housing 12 is not necessarily to be limited to such a specific shape. In the depicted embodiment, however, the compression housing 12 includes upper and lower parallel walls, 14 and 14' respectively, and left and right angled sidewalls, 16, 16' respectively, as shown. A central core 18 is shown, protruding from one end of the end fitting 10. All parts may be formed of an aluminum alloy, unless otherwise noted. Because each of the orientations of the end fitting 10, as depicted in FIGS. 1-3, is different, the view of FIG. 1 is herein designated as the primary reference with respect to orientation; e.g. the previously designated "upper and lower" parallel walls 14 and 14', respectively.

Figure 2:
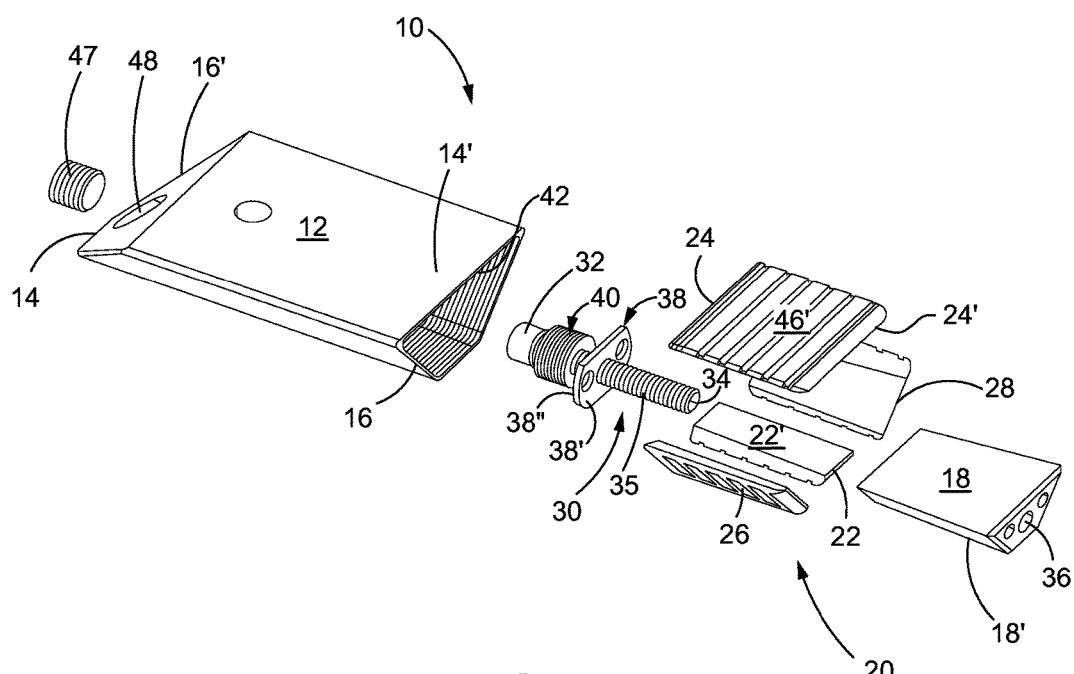
FIG. 2 is an exploded view of the end fitting of FIG. 1, albeit depicted in a different orientation than that of FIG. 1.

Referring now to FIG. 2, it will be appreciated that the central core 18, now shown on the right-hand side of the end fitting 10, is only one part of an expansion assembly 20 that includes a circumferential array of expansion wedges 22, 24, 26, and 28, as shown. Each of the expansion wedges is associated with a particular wall 14, 14', 16, and 16' of the trapezoidal compression housing 12 for reasons that will be explained. Referring now back to FIG. 1 for orientation, the top or upper expansion wedge 22 corresponds and interacts with the upper wall 14; the bottom expansion wedge 24 corresponds and interacts with the lower wall 14'; the left side expansion wedge 26 corresponds and interacts with the left side wall 16; and the right side expansion wedge 28 corresponds and interacts with the right side wall 16'.

This described embodiment of the expansion assembly 20 also includes an elongated hollow threaded member, such as a cap screw 30 having a socket head 32, as shown. The cap screw 30, hollow to accommodate venting of a gaseous medium such as nitrogen, for example, has a shank end 34 configured to be inserted into an interior threaded aperture 36 of the central core 18. A flat washer 38, supported on a non-threaded portion of an otherwise threaded shank 35, includes forward and rearward faces 38', and 38", respectively. A spring mechanism, depicted as a plurality of spring washers 40, such as Bellville style washers shown, is configured for installation between the rearward face 38" of the washer 38 and the socket head 32 of the cap screw 30. The purposes and interactions of each of these features may be better understood in reference to an assembled cross-sectional view of the end fitting 10, as now described.

Figure 3:
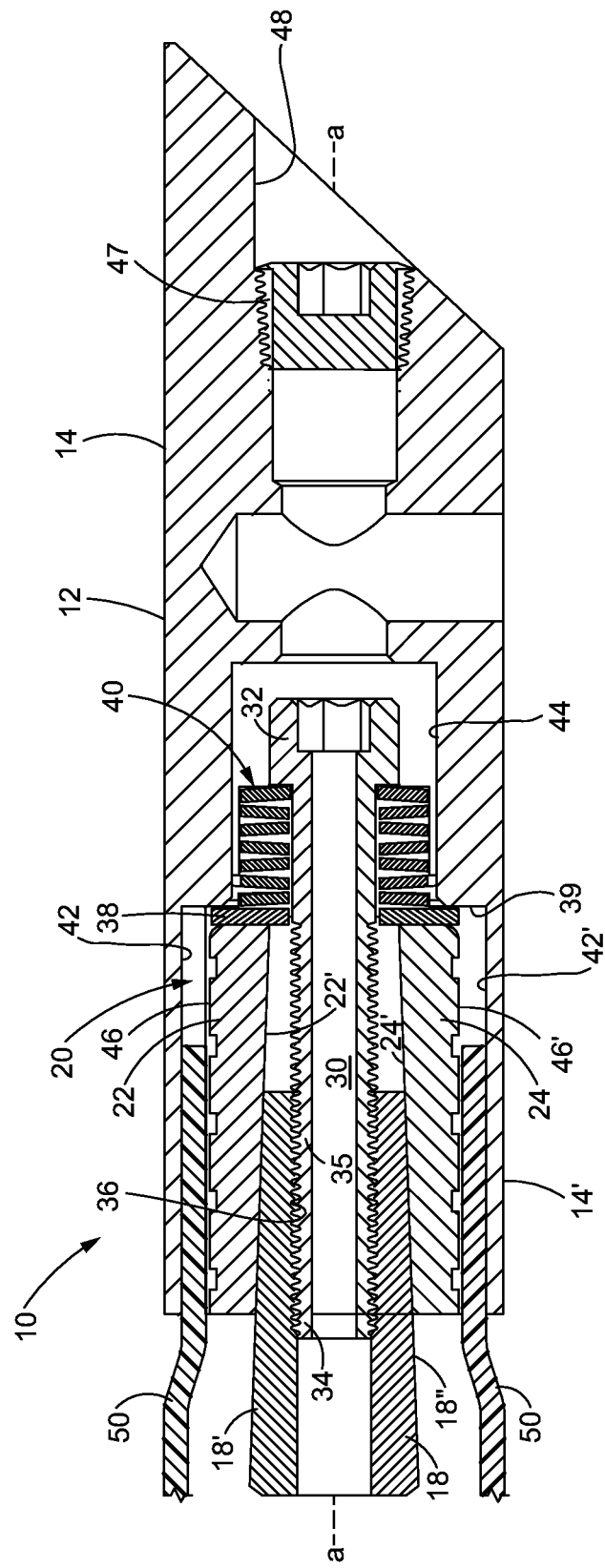
FIG. 3 is a cross-sectional view of the end fitting, taken along section lines 3-3 of FIG. 1.

Referring to FIG. 3, a cross-sectional view of an assembled mandrel bladder end fitting 10, taken along lines 3-3 of FIG. 1, reveals the expansion assembly 20 contained within the compression housing 12, wherein both are oriented along a longitudinal axis "a-a". The compression housing 12 has two separate but adjacent interior volume portions, as reflected by a first, larger, interior volume 42 and a second, smaller, interior volume 44. An interface between the two volumes 42, 44 is defined by an annular surface 39 against which the flat washer 38 is seated. As such, the expansion assembly 20, along with the threaded shank 35 of the cap screw 30, is contained within the larger volume 42, while the socket head 32 and the stack of spring washers 40 are contained within the smaller volume 44. It may now be apparent that as the cap crew 30 is rotated (for example clockwise, as shown) via its socket head 32, the central core 18 will be pulled axially toward the washer 38, against spring forces created by the spring washers 40.

Access to the socket head 32 for its rotation is provided via an access opening 48, oriented along the longitudinal axis a-a, at the right end of the housing 12, as shown. During actual use of the end fitting, i.e. during curing operation in a layup when the end fitting is secured to a mandrel bladder, the access opening 48 is closed via a threaded plug 47. To facilitate removal of the plug 47, the plug may be formed of steel, and thus rendered easier to be physically removed from the aluminum housing 12, due to different coefficients of thermal expansion of aluminum and steel, as will be appreciated by those skilled in the art.

As the central core 18 is pulled toward the washer 38 via described rotation of the cap screw 30, the expansion wedges 22, 24, 26, 28 (only the top and bottom wedges 22 and 24 are shown in the cross-sectional view of FIG. 3), will be forced radially outwardly to clamp an open end of a mandrel bladder 50 between parallel clamping surfaces 42 and 46. In FIG. 3, the larger interior volume 42 is represented by an upper interior wall 42, as shown. The upper interior wall 42, with a lower interior wall 42', and simultaneously with interior walls of the noted left and right angled sidewalls 16 and 16' (neither shown in FIG. 3), collectively act as a first clamping surface.

Correspondingly, the radially outer surfaces of the expansion wedges 22, 24, 26, 28 (only wedges 22 and 24 being shown) collectively comprise second clamping surfaces 46 and 46'. Continuing reference to FIG. 3, it will be appreciated that only the radially outer clamping surface 46 of the top wedge 22 and a corresponding radially outer clamping surface 46' of the bottom wedge 24 are depicted. Those skilled in the art will appreciate that the functionality of the described clamping mechanism is, however, equally applicable to the respective exterior clamping surfaces associated with the left and right angled expansion wedges 26 and 28.

For assuring only radial movements of each of the expansion wedges 22, 24, 26, 28 relative to their respective associated top wall 14, bottom wall 14', left wall 16 and right wall 16' counterparts, the central core 18 contains exterior angled surfaces that are complementary and cooperative with corresponding interior angled surfaces of the respective wedges. The angles may be relatively slight, for example within a range of 5-10° with respect to the axis "a-a" of the housing 12. Thus, referring to FIGS. 2 and 3, the central core 18 has a top angled surface 18' which interacts with a bottom surface 22' (FIG. 3) of the top expansion wedge 22.

Correspondingly, FIG. 3 also reveals that the central core 18 has a bottom angled surface 18" that interacts with the bottom surface 24' of the bottom expansion wedge 24. As such, the angled surfaces 18' and 22' as well as angled surfaces 18" and 24' are configured so that any axial motion between them will result only in radially outward movement of the wedges 22 and 24, since any rightward axial movement of the wedges 22, 24 is prevented by the radially extending washer 38. Of course the side wedges 26 and 28 (although shown only in FIG. 2), act in concert with the wedges 22 and 24, and will be equally constrained against axial movement by the washer 38. As such, the wedges 26 and 28 will move only radially outwardly, as well.

In the described embodiment, the mandrel bladder 50 is formed of a durable rubber material, for example a Viton. As the open end of the bladder 50 is radially squeezed between the above-described clamping surfaces as shown, a fluid-tight sealing connection is established and configured to prevent leakage of a pressurized gas, for example nitrogen, at pressures of up to 100 psi, for example.

The above-described components and interactions of such components of the mandrel bladder end fitting 10 are capable of producing a purely mechanical end fitting coupling structure.

Another approach, which may be described as a hybrid end fitting, involves the use of an adhesive along with the mechanical system described.

HYBRID EXAMPLE

A hybrid mechanical/adhesive method may additionally be used to secure an end fitting to a mandrel bladder 50, as follows:
  a) Co-cure the bladder opening with a layer of uncured silicone, after first grit-blasting the inner surface of the aluminum end fitting.
  b) Pre-treat the inner surface of the aluminum end fitting with a primer, such as Dow Corning PR2260.
  c) Apply a second layer of uncured silicone with the bladder inserted into the end fitting.
  d) Mechanically torque the cap screw to a recommended value, and then cure the second uncured layer of silicone.

The method may further include providing the above-identified PR2260 as a primer to alter the aluminum surface for creation of a stronger bond, by way of a further example.

Figure 4:
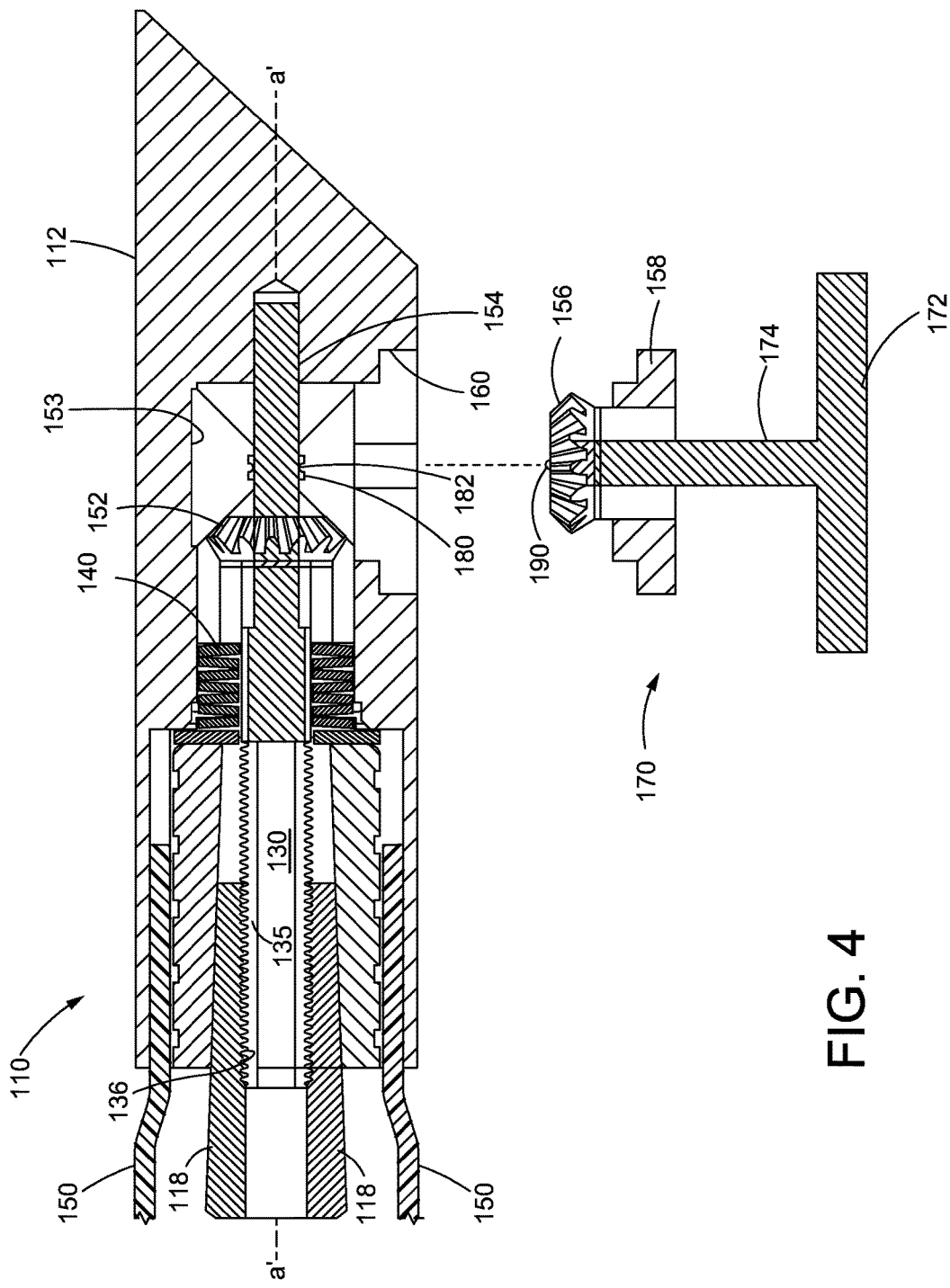
FIG. 4 is a cross-sectional view of an alternate embodiment of an end fitting, constructed in accordance with the present disclosure.

Referring now to FIG. 4, an alternate embodiment of an end fitting 110 utilizes an elongated hollow stud shaft 130 as the threaded member, in lieu of the elongated cap screw 30 of the first described embodiment. The stud shaft 130 has a similar corresponding threaded end 135, but utilizes a bevel gear 152 secured to the stud shaft 130 for accommodating physical rotation of the stud shaft 130 within an interior threaded aperture 136 of the central core 118. The bevel gear 152 is situated within a vent passage 153, and secured to the stud shaft 130 at a non-threaded end 154 of the stud shaft 130. The bevel gear 152 is axially separated from the threaded end 135 by a stack of spring washers 140.

A second bevel gear 156 is provided as a part of a separate hand tool 170, configured to be inserted into a vent access opening 160 to engage and rotate the first bevel gear 152 for securement of the bladder 150 to the end fitting 110 in the manner earlier described. Rotation of the second bevel gear 156 is achieved by manual manipulation of a T-handle 172 of the hand tool 170. The latter action will rotate the first bevel gear 152, causing the stud shaft 130 to rotate, axially pulling the central core 118 rightwardly in the view shown, since the bevel gear 152 is axially constrained against the stack of spring washers 140.

As noted, the second bevel gear 156 is part of the tool 170. Ideally, it is fixedly secured to a shank 174 of the tool, to which the T-handle is also rigidly affixed. A bushing 158 may also be fixedly supported on the shank 174 behind the bevel gear to control, i.e. limit, physical amount of tool insertion into the vent access opening 160.

Finally, the non-threaded portion 154 of the elongated stud shaft 130 contains a tool locator ring 180 fixedly secured thereto. The tool locator ring 180 incorporates an exterior annular channel 182 configured for receiving a locator boss 190. The boss is essentially a nose that projects from the free end of the bevel gear 156 as shown.

Figure 5:
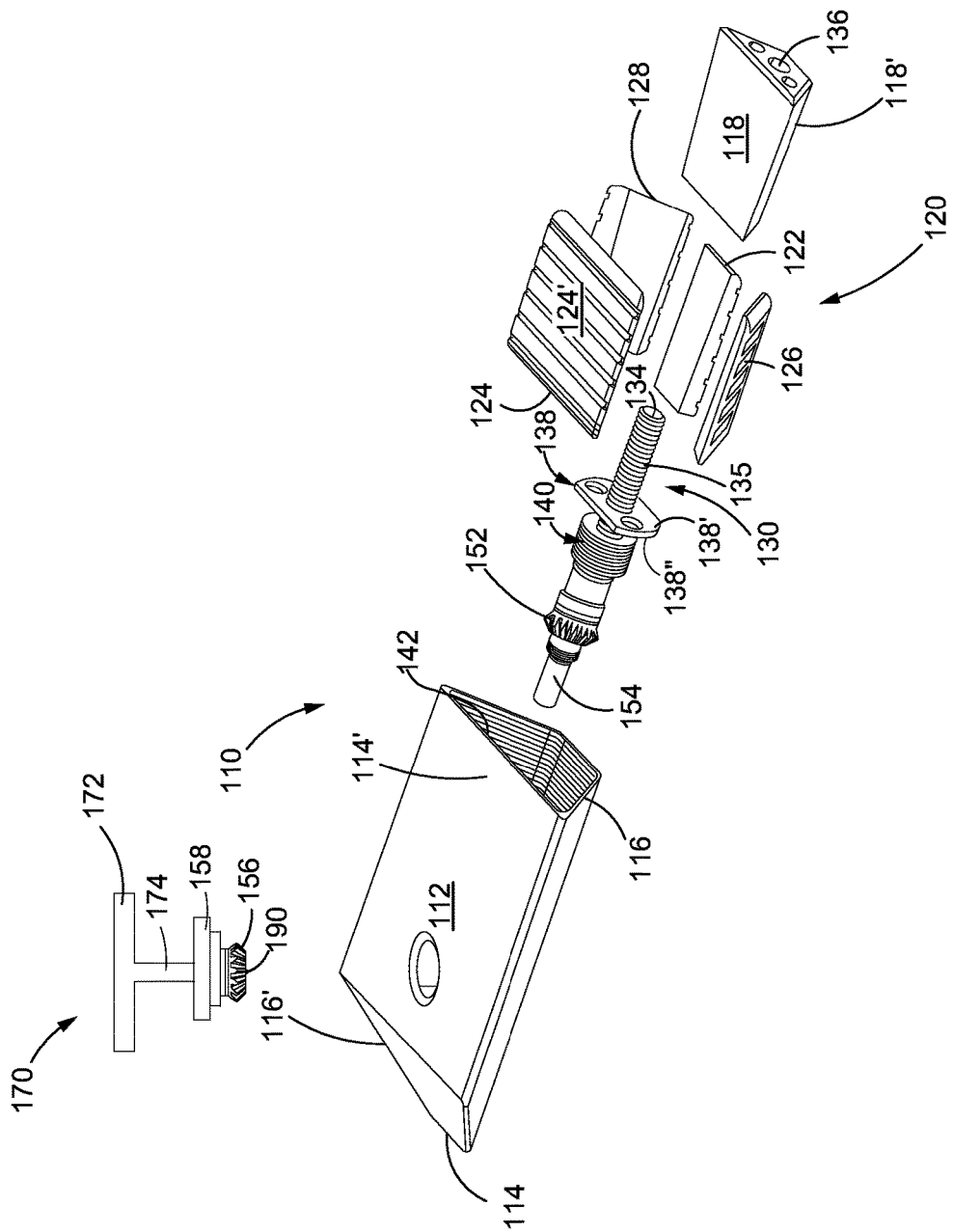
FIG. 5 is an exploded view of the end fitting of FIG. 4, depicted in an orientation similar to that of FIG. 2, to facilitate comparison of embodiments.

FIG. 5 is an exploded perspective view of the end fitting 110 of FIG. 4, analogous to the exploded perspective view of the end fitting 10 of FIG. 2. It will be appreciated by those skilled in the art that the end fitting 110 (FIGS. 4 and 5) does not include an access opening 48 as does the end fitting 10 (FIGS. 2 and 3), nor a plug 47, as necessary to close the opening 48, during a layup curing process that involves the end fitting 10. As such, the housing 112 of the end fitting 110 is less subject to leakage issues, since the use of a steel plug in the aluminum housing necessarily introduces potential issues of leakage due to the dissimilar coefficients of thermal expansion of respective aluminum and steel metals.

The disclosed mandrel bladder end fittings 10 and 110 may have other variations and alternative constructions neither described nor suggested herein. For example, although the compression housing 12, 112 and central core 18, 118 of the respectively described embodiments have been described only in terms of trapezoidal cross-sections, other cross-sections and indeed the shapes of these and indeed of other components may be utilized. Moreover, although the components described may have been formed only of aluminum or an aluminum alloy, other materials may be envisioned for use in constructing the disclosed mandrel bladder end fittings 10, 110, as may be appreciated by those skilled in the art.

What is claimed is:

1. An end fitting configured for securing a fluid-tight sealing connection with an open end of a mandrel bladder, the end fitting, comprising:
   an outer body having a longitudinal axis, and an interior wall extending about the longitudinal axis, the interior wall defining a first clamping surface, wherein the outer body has first and second axially oriented interior volumes separated by a radially extending annular step, the volumes being defined by first and second circumferentially extending interior walls, respectively, with the first volume having a larger interior wall than the second, and wherein the first interior wall defines the first clamping surface;
   an expansion assembly configured for containment within the first clamping surface, the expansion assembly comprising a central core coaxially aligned with the outer body, an array of expansion wedges situated circumferentially about the central core and between the central core and the first clamping surface, the expansion wedges defining radially outer surfaces that collectively define a second clamping surface, and an axially extending threaded member that engages the central core and is movable to move the central core axially within the first volume;
   wherein, relative to the longitudinal axis of the outer body, the expansion wedges are axially juxtaposed against the annular step so that the annular step prevents any axial movement of the expansion wedges so that the second clamping surface is restricted to orthogonal movement with respect to the first clamping surface, such that the end fitting is adapted to prevent axial motion between the first and second clamping surfaces while securing a fluid-tight connection with an open end of a mandrel bladder.

2. The end fitting of claim 1, wherein the expansion wedges have radially inwardly facing surfaces, and the central core has complementary angled outer faces that cooperatively interact with the radially inwardly facing surfaces.

3. The end fitting of claim 1, wherein the axially extending threaded member has a socket head at one end with an externally threaded shank extending from the socket head, the central core includes an interior threaded aperture, and wherein the threaded shank cooperates with the interior threaded aperture.

4. The end fitting of claim 1, further comprising a vent passage including a first bevel gear supported in the vent passage, the central core including an interior threaded aperture, wherein the axially extending threaded member comprises an axially extending stud having an externally threaded portion at one end that cooperates with the interior threaded aperture, and wherein the first bevel gear is secured to an opposite end of the stud, and cooperates with an externally applied second bevel gear to rotate the first bevel gear.

5. The end fitting of claim 4, wherein the first bevel gear rotates about the longitudinal axis, the second bevel gear rotates about an axis orthogonal to the longitudinal axis, and wherein the second bevel gear is applied though a vent passage situated orthogonally to the longitudinal axis.

6. An end fitting configured for securing a fluid-tight sealing connection with an open end of a mandrel bladder, the end fitting, comprising:
an outer body having a longitudinal axis, and an interior wall extending about the longitudinal axis, the interior wall defining a first clamping surface, wherein the outer body has first and second axially oriented interior volumes separated by a radially extending annular step, the volumes being defined by first and second circumferentially extending interior walls, respectively, with the first volume having a larger interior wall than the second, and wherein the first interior wall defines the first clamping surface;
an expansion assembly configured for containment within the first clamping surface, the expansion assembly comprising a central core coaxially aligned with the outer body, an array of expansion wedges situated circumferentially about the central core and between the central core and the first clamping surface, the expansion wedges defining radially outer surfaces that collectively define a second clamping surface, and an axially extending threaded member having a socket head at one end with an externally threaded shank extending from the socket head, the central core includes an interior threaded aperture, and wherein the threaded shank cooperates with the interior threaded aperture; and
a washer,
wherein, relative to the longitudinal axis of the outer body, the second clamping surface is restricted to orthogonal movement with respect to the first clamping surface, such that the end fitting is adapted to prevent axial motion between the first and second clamping surfaces while securing a fluid-tight connection with an open end of a mandrel bladder, and wherein the annular step is defined by an annular wall within the first volume, and the washer is seated against the annular step, and wherein the expansion wedges are axially juxtaposed against the seated washer, and at least one beveled washer spring is interposed between the socket head and a second side of the washer within the second volume, the washer circumferentially overlying a portion of the threaded member and producing an axial reaction between the socket head and the washer.

7. The end fitting of claim 6, wherein when the socket head is rotated in one direction, the central core is moved axially toward the washer to move the second clamping surface radially outwardly toward the first clamping surface of the outer body, wherein the washer prevents any axial movement of the expansion wedges during radially outward movement of the second clamping surface; and wherein the expansion wedges have radially outer surfaces parallel to the axis that move only radially outwardly upon rotation of the threaded member.

8. The end fitting of claim 6, wherein the washer is contained within the first volume of the outer body, and wherein the socket head and the beveled washer spring are contained within the second volume of the outer body.

9. A mandrel bladder end fitting assembly, comprising:
a mandrel bladder having an openable end along an axis;
an end fitting having an outer body situated about the openable end along the axis, the outer body having juxtaposed first and second interior volumes concentrically situated about the axis, the volumes having first and second diameters, respectively, with an interface of the volumes being defined by a radially oriented annular step;
an expansion plug assembly configured for containment within the first interior volume of said outer body, the expansion plug assembly comprising a central core having an internally threaded aperture, with a plurality of flat, angled sides, each side defining a cam; the expansion plug assembly further comprising a separate plurality of mated expansion wedges, each expansion wedge corresponding with one cam;
an elongated cap screw defined by an elongated hollow body having a socket head at one end with an externally threaded portion extending from the socket head, wherein an unthreaded portion is situated between the socket head and threaded portion;
a flat washer seated against the annular step;
at least one beveled washer spring circumferentially overlying the unthreaded portion of the cap screw, reacting between the socket head and the flat washer;
wherein when the socket head is rotated in one direction, the cap screw pulls the central core axially toward the flat washer, forcing the expansion wedges radially outwardly toward the outer body;
wherein the radially outward movement of the expansion wedges is configured to clamp the open end of the mandrel bladder against the outer body, and to achieve a fluid tight seal when the bladder contents are under positive fluid pressure; and
wherein an adhesive silicone material overlies the openable end of the mandrel bladder when the openable end is clamped between the expansion wedges and the outer body.

10. The mandrel bladder end fitting assembly of claim 9, wherein the expansion wedges have radially inwardly facing surfaces.

11. The mandrel bladder end fitting assembly of claim 10, wherein the central core has complementary angled outer faces that cooperatively interact with the radially inwardly facing surfaces of the expansion wedges.

12. The mandrel bladder end fitting assembly of claim 9, wherein the expansion wedges parallel to the axis have radially outer surfaces that move only radially outwardly upon rotation of the cap screw.

13. The mandrel bladder end fitting assembly of claim 9, wherein the flat washer is contained within the first volume of the outer body.

14. The mandrel bladder end fitting assembly of claim 9, wherein the socket head and the beveled washer spring are contained within the second volume of the outer body.

15. The mandrel bladder end fitting assembly of claim 9, further comprising a plurality of beveled washer springs.

16. The mandrel bladder end fitting assembly of claim 9, wherein the outer body is formed of metal, and has a trapezoidal cross section about its axis.

17. The mandrel bladder end fitting assembly of claim 9, wherein the axis of the outer body is longitudinal.

18. A method of making a mandrel bladder end fitting assembly, comprising the steps of:
forming a mandrel bladder having an openable end along an axis;
applying an end fitting about the openable end along the axis of the outer body, with the outer body having juxtaposed first and second interior volumes concentrically situated about the axis, the volumes having first and second diameters, respectively, with an interface of the volumes being defined by a radially oriented annular step;

applying an expansion plug assembly configured for containment within the first interior volume of said outer body, the expansion plug assembly comprising a central core having an internally threaded aperture, with a plurality of flat, angled sides, each side defining a cam; the expansion plug assembly further comprising a separate plurality of mated expansion wedges, each expansion wedge corresponding with one cam;

applying an elongated cap screw, defined by an elongated hollow body having a socket head at one end with an externally threaded portion extending from the socket head, to the internally threaded aperture, and wherein the cap screw has an unthreaded portion situated between the socket head and threaded portion;

applying a flat washer seated against the annular step;

configuring at least one beveled washer spring to circumferentially overlie the unthreaded portion of the cap screw for reacting between the socket head and the flat washer;

wherein when the socket head is rotated in one direction, the cap screw pulls the central core axially toward the flat washer, forcing the expansion wedges radially outwardly toward the outer body;

wherein the radially outward movement of the expansion wedges is configured to clamp the open end of the mandrel bladder against the outer body, and to achieve a fluid tight seal when the bladder contents are under positive fluid pressure; and applying an uncured adhesive silicone material in a layer to the openable end of the mandrel bladder, and curing the silicone material before the openable end is clamped between the expansion wedges and the outer body.

19. The method of claim 18, further comprising the step of grit blasting the openable end prior to any application of an uncured silicone layer.

\* \* \* \* \*